United States Patent
Lepretre et al.

(10) Patent No.: US 7,073,336 B2
(45) Date of Patent: Jul. 11, 2006

(54) PROVISION OF SEALING FOR THE CABIN-AIR BLEED CAVITY USING A SEGMENT SEAL

(75) Inventors: Gilles Lepretre, Epinay sous Senart (FR); Didier Hernandez, Quiers (FR)

(73) Assignee: Snecma Moteurs, Paris (FR)

( * ) Notice: Subject to any disclaimer, the term of this patent is extended or adjusted under 35 U.S.C. 154(b) by 88 days.

(21) Appl. No.: 10/928,247

(22) Filed: Aug. 30, 2004

(65) Prior Publication Data

US 2005/0056025 A1   Mar. 17, 2005

(30) Foreign Application Priority Data

Sep. 11, 2003   (FR) .................................. 03 10685

(51) Int. Cl.
*F02C 7/00* (2006.01)

(52) U.S. Cl. ............................ 60/751; 60/796; 415/207

(58) Field of Classification Search .................. 60/751, 60/752, 796, 799; 415/207
See application file for complete search history.

(56) References Cited

U.S. PATENT DOCUMENTS

| 4,190,397 A | * | 2/1980 | Schilling et al. | ............ 415/112 |
| 4,502,276 A | | 3/1985 | Pask | |
| 4,554,789 A | * | 11/1985 | Napoli et al. | .................. 60/751 |
| 4,613,280 A | | 9/1986 | Tate | |

FOREIGN PATENT DOCUMENTS

| CA | 1 221 034 | 4/1987 |
| DE | 26 03 867 | 6/1977 |
| EP | 0 974 736 | 1/2000 |
| GB | 2 011 553 | 7/1979 |

* cited by examiner

*Primary Examiner*—Louis J. Casaregola
(74) *Attorney, Agent, or Firm*—Oblon, Spivak, McClelland, Maier & Neustadt, P.C.

(57) ABSTRACT

The invention relates to the sealing of the cavity from which air is bled off to the cabin, which cavity is delimited, on the one hand, by the external shell (6) of the compressor and an annular structure (7) connected to the shell, and, on the other hand, by the external casing (12) of the diffuser grating and a strut (13) connected to said external casing and to an external engine casing shell (14), this external casing shell (14) being fastened to the annular structure (7) by bolting together flanges, using sealing means provided between the annular structure (7) and the external casing (12) of the diffuser grating.

The sealing means comprise a split annular segment (50) whose radially internal part (51) is housed in a radially sliding and sealed manner in a groove (32) provided at the periphery of the upstream part (12a) of the external casing (12) of the grating of the diffuser, the periphery (52) of said segment bearing on the internal surface (54) of a cylindrical sleeve (53) which is integral with the annular structure (7) and surrounds said segment (50).

6 Claims, 3 Drawing Sheets

PROVISION OF SEALING FOR THE CABIN-AIR BLEED CAVITY USING A SEGMENT SEAL

The invention relates to a jet engine comprising, from upstream to downstream (the upstream and downstream directions being defined by the direction of circulation of the primary flow), a high-pressure compressor, a diffuser grating and a combustion chamber, said high-pressure compressor comprising an external shell which radially delimits the duct for said primary flow and is connected to an annular structure extending radially outward, said diffuser grating comprising in the axial continuation of said external compressor shell an external casing connected to a rearwardly oriented conical strut delimiting, upstream, the end of said combustion chamber, said strut itself being connected to an external casing shell which extends in the upstream direction and is fastened to said annular structure by fastening means, said strut, said external casing shell and said annular structure defining a cavity around said diffuser grating, air bleed orifices being made in said strut in order to bring the end of the combustion chamber into communication with said cavity, said external casing shell being equipped with outlet vents for the bled air, and sealing means being provided between said annular structure and said external diffuser grating casing in order to isolate said cavity from the duct for the primary flow.

Air required for the cabin of the airplane equipped with at least one jet engine is bled off at the end of the combustion chamber in a region where it has the least disruptive effect on the overall efficiency of the engine. Bleeding takes place through the orifices in the strut, which makes it easy to install the outlet vents for the bled air. This arrangement requires relative sealing between the duct of the high-pressure compressor and the cavity situated above the grating of the diffuser.

This sealing is all the more difficult to achieve because the relative displacements between the diffuser grating and the external shell of the compressor are of the order of 1.5 mm in the axial direction and substantially of the same order in the radial direction, owing to the thermal and mechanical responses of the various components in an environment subjected to high pressures which may reach 30 bar and to high temperatures which may reach 650° C.

The current technology adopted to provide sealing between the compressor and the external casing of the grating is of the type comprising a seal made up of a strip and counterseal with springs pressing against these. This technology in fact allows a sufficiently large displacement between the two components.

The prior art is illustrated by FIG. 1, which shows the last stage of a high-pressure compressor 1 of a jet engine having, from upstream to downstream in the direction of the primary flow F1, a ring of fixed vanes 2 extending radially inward from an external casing 3, followed by a ring of moving blades 4 mounted at the periphery of a compressor wheel 5 and extending outward as far as an external compressor shell 6 which, together with the external casing 3, radially delimits the duct for the primary flow, this external shell 6 being connected to an annular structure 7 which has a V-shaped cross section in the plane containing the axis of the jet engine, extends radially outward and is fastened to the external casing of the engine by bolting.

Provided downstream of the compressor 1 is a diffuser grating 10 which receives the compressed air from the compressor 1 and delivers it toward a combustion chamber 11. In the axial continuation of the external shell 6 of the compressor 1, the grating 10 has an external casing 12 connected to a conical strut 13 oriented toward the rear of the jet engine, this strut 13 defining the upstream wall of the end of the combustion chamber 11 and being connected in its radially outer region to an external casing shell 14 which extends in the upstream direction and has an upstream flange 15 by means of which the assembly consisting of the combustion chamber and the diffuser can be fastened on a radially outer flange 16 of the annular structure 7 by bolting.

A cavity 20 surrounding the diffuser grating 10 is thus delimited axially by the annular structure 7 and the strut 13, radially outwardly by the external casing shell 14 and radially inwardly by the downstream portion 6a of the external compressor shell 6 and by the upstream portion 12a of the external casing 12, a gap 21 separating these two portions.

The strut 13 has air bleed orifices 22 at the end of the combustion chamber and the external casing shell 14 is equipped with outlet vents 23 to supply a flow of air for aerating the cabin of the airplane or for cooling other elements of the jet engine.

Sealing between the compressor duct and the cavity 20 is achieved, as is shown in detail in FIG. 2, by a sectorized seal made up of strips 30 lined with counterseals 31, this seal being mounted on the periphery of the upstream portion 12a of the external casing 12 of the diffuser grating. To this end, this upstream portion 12a has over its periphery a channel 32 delimited by two flanges, the upstream one having the reference 33a and the downstream one having the reference 33b, which flanges have holes drilled into them for fastening rivets 34. The strips 30 and the counterseals 31 are kept in bearing contact with the downstream face of the upstream flange 33a by means of springs 35 and are retained by the rivets 34. The springs 35 are likewise retained by the rivets 34. The radially internal portion of the annular structure 7 has an annular projection 40 which extends axially into the cavity 20 and the end of which is situated above the upstream flange 33a in the absence of any axial displacement between the external shell 6 of the compressor 1 and the external casing 12 of the diffuser, as is shown in FIG. 2.

The springs 35 bear on the seals in the annular region separating the projection 40 from the upstream flange 33a. Moreover, the air pressure in the cavity 20 is slightly greater than the pressure in the duct at the gap 21.

The bearing points for the seals 30 on the projection 40 side and on the upstream flange 33a side have convex surfaces. The combined forces of the springs 35 and the pressure difference across the two faces of the seals 30 press the strips 30, which are flat, against these surfaces in the configuration shown in FIG. 2, thus providing sealing.

In certain flight phases, the bearing between the strips 30 and the projection 40 leaves an escape clearance, especially when the projection 40 passes above the channel 32, as is shown in FIGS. 4 and 5. Between two consecutive springs, the strips 30 move away from the projection and only the pressure difference between the two faces, which is small, may prevent the creation of this separation. An escape clearance 41 is then formed between the strips and the end of the projection 40.

When, by contrast, the diffuser grating 10 moves away from the compressor 1, as can be seen in FIG. 3, the force due to the pressure difference and the force of the springs 35 allow correct sealing to be achieved, by deformation of the strips 30.

The double arrows shown in FIG. 2 indicate the relative axial and radial displacements between the downstream end of the external compressor shell 6 and the upstream end of the external casing 12 of the diffuser grating 10.

It should also be noted that the arrangement of this sealing system borne by the external casing 12 makes it possible for the combustion chamber/diffuser assembly to be assembled on the compressor by relative axial displacement of said assembly with respect to the compressor and then by bolting together the external flanges 15 and 16.

The aim of the invention is to propose a jet engine, as mentioned in the introduction, in which sealing between the air bleed cavity and the duct for the primary flow in the compressor is ensured irrespective of the relative position between the external shell of the compressor and the external casing of the grating of the diffuser.

The invention achieves its aim by virtue of the fact that the sealing means comprise a split annular segment whose radially internal part is housed in a radially sliding and sealed manner in a groove provided at the periphery of the upstream part of the external casing of the grating of the diffuser, the periphery of said segment bearing on the internal surface of a cylindrical sleeve which forms part of the annular structure and surrounds said segment.

The outside diameter of the segment, in the free state, is slightly greater than the inside diameter of the sleeve. As a result of spring action, the periphery of the segment bears positively against the internal surface of the sleeve and the segment is always centered with respect to the sleeve. In the event of relative radial displacement between the external casing of the diffuser and the sleeve, the segment slides in the groove. In the event of relative axial displacement between these two elements, the segment slides in the sleeve.

Other advantages and features of the invention will emerge on reading the description below given by way of example and with reference to the appended drawings, in which:

FIGS. 1 to 5 show the prior art:

FIG. 1 being a half-section, in a plane containing the axis of the jet engine, of the downstream part of a compressor and of the diffuser, which shows the layout of the cavity communicating with the end of the combustion chamber and from which air is bled for the cabin of the airplane, and the installation of the seal, according to the prior art, between this cavity and the duct for the primary flow;

FIGS. 1 to 5 showing the prior art have been commented on above and do not require any further explanations.

Figure 1:
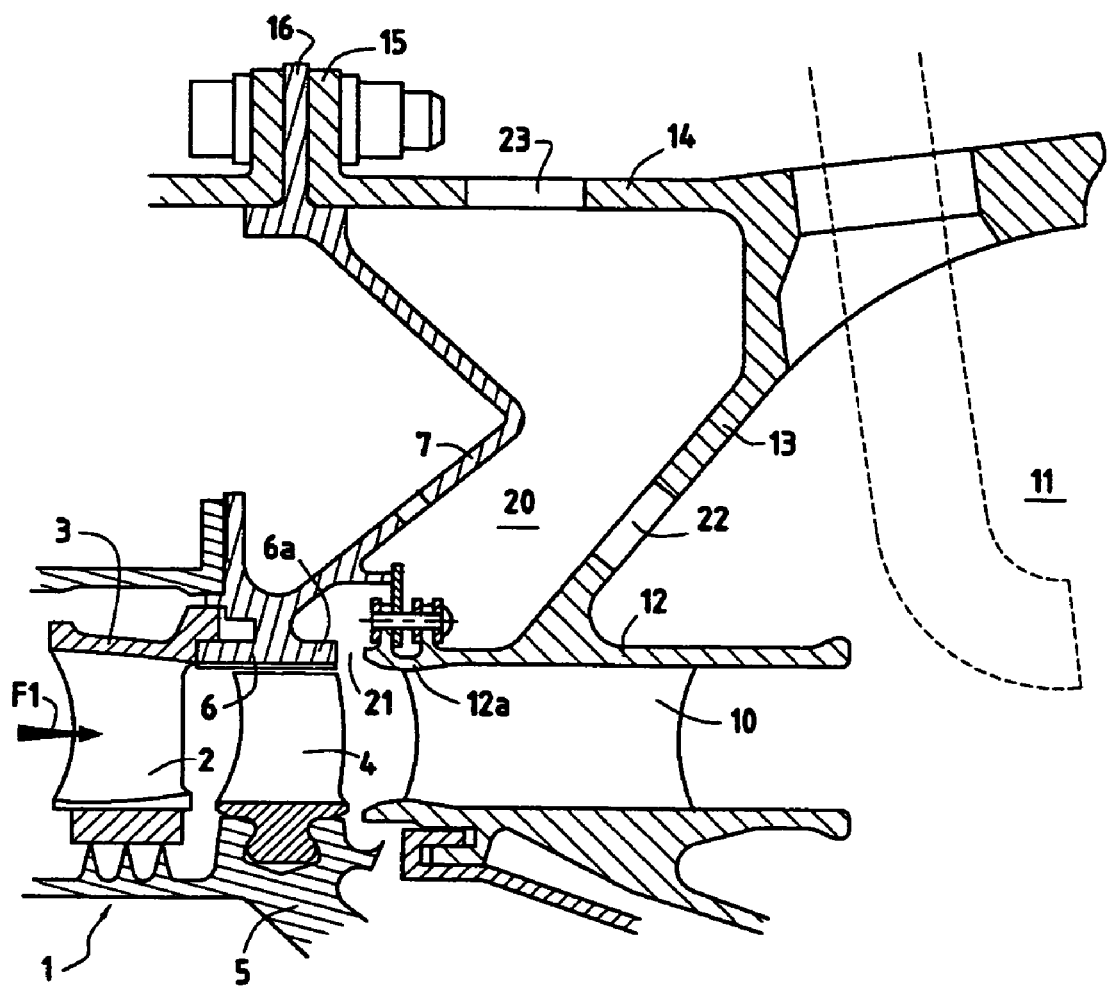
Figure 2:
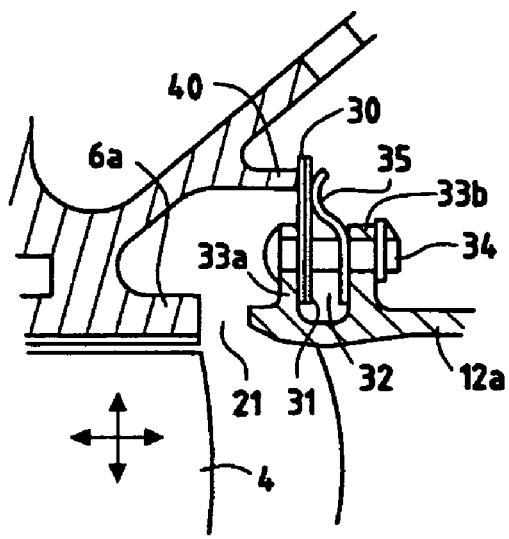
FIG. 2 shows the arrangement of the seal according to the prior art on a larger scale.
Figure 3:
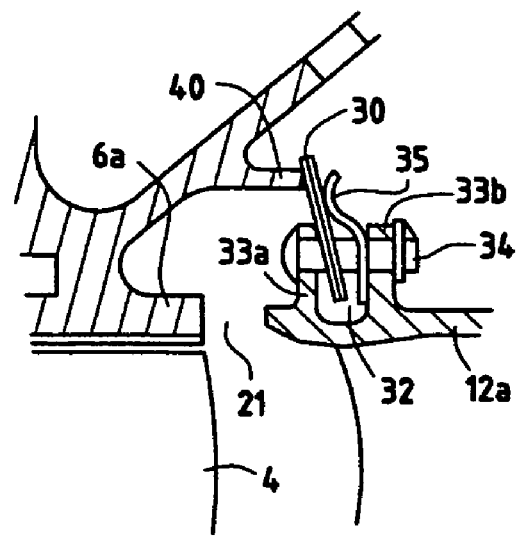
FIG. 3 shows the deformation of the seal when there is an increase in the gap between the external shell of the compressor and the external casing of the grating of the diffuser.
Figure 4:
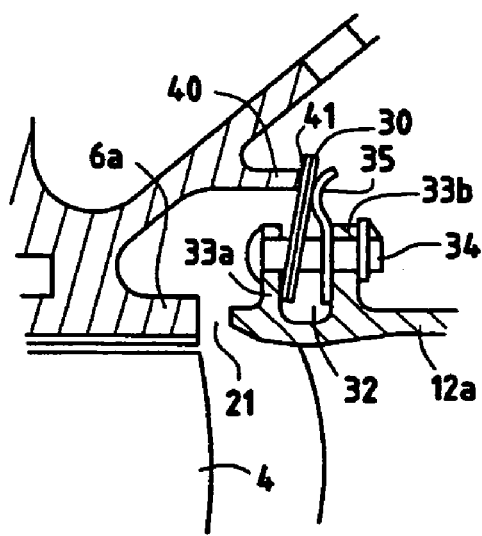
FIG. 4 shows the deformation of this same seal when there is a reduction in this gap.
Figure 5:
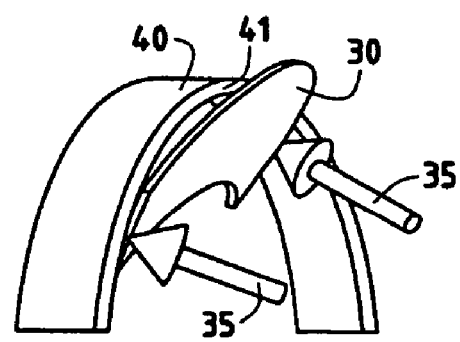
FIG. 5 is a perspective view of the seal when there is a reduction in the gap, which shows the escape clearance.
Figure 6:
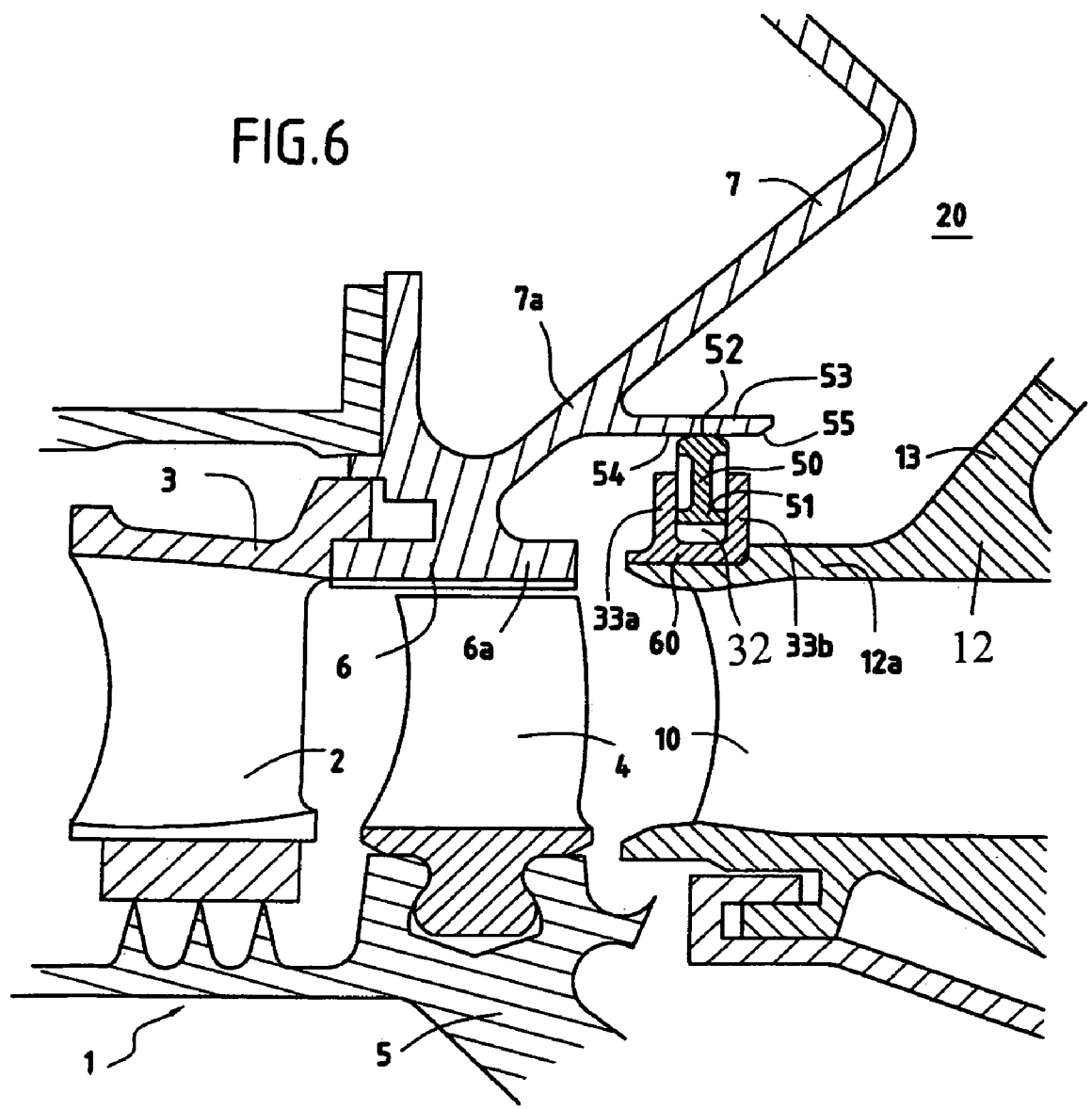
FIG. 6 is a sectional view of the outer region of the duct for the primary flow, situated between the compressor and the diffuser, and shows the sealing system proposed by the invention.
Figure 7:
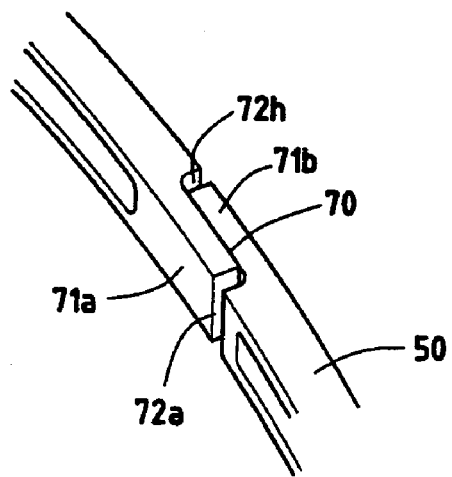
FIG. 7 shows part of the split segment in perspective.

FIGS. 6 and 7 show the sealing device proposed by the invention, the elements which are identical to those represented in FIGS. 1 to 5 bearing the same. references.

The upstream part 12*a* of the external casing 12 of the grating 10 of the diffuser comprises at its periphery a groove 32 delimited by an upstream flange 33*a* and a downstream flange 33*b*. These two flanges may be the flanks of a ring 60 which has a peripheral groove 32 and is welded to the periphery of the upstream part 12*a*.

The groove 32 is intended to receive, in a sliding and sealed manner, the radially inner part 51 of a split segment 50 having an I-shaped cross section and the periphery of which preferably has a convex surface 52.

The radially inner part 7*a* of the annular structure 7, which is substantially conical and parallel to the strut 13, comprises a sleeve 53 which extends downstream into the cavity 20 and surrounds the segment 50 and the flanges 33*a* and 33*b*. The internal surface 54 of this sleeve is cylindrical and the periphery 52 of the segment bears against this surface 54. The cylindrical internal surface 54 is connected downstream to a frustoconical surface 55 which is substantially parallel to the strut 13.

The outside diameter of the ring 50 in the free state, that is to say in the nonfitted, unstressed state, is slightly greater than the inside diameter of the sleeve 53.

In the fitted state, as represented in FIG. 6, the ring 50 is compressed.

During assembly of the diffuser on the compressor by axial displacement, the frustoconical surface 55 compresses the ring 50 in the groove 32. The dimensions of this frustoconical surface 55 and the outside and inside diameters of the segment 50 are calculated to allow blind assembly of the compressor and the diffuser.

The inside diameter of the segment 50 and the outside diameter of the bottom of the groove 32 are selected in such a way as to allow radial displacement of the segment 50 in the groove 32 during operation.

The width of the radially inner part 51 of the segment 50 is substantially equal to that of the groove 32 in order to provide sealing in this region and radial sliding of the segment 50 in the groove 32 during relative radial displacements between the upstream part 12*a* of the external casing 12 and the sleeve 53, the segment 50 being guided by the sleeve 53. In the event of relative axial displacement between the upstream part 12*a* and the external shell 6 of the compressor, the segment 50, retained by the groove 32, slides in the sleeve 53.

FIG. 7 shows the segment 50 in the region of the slit 70, which is made in the form of a radial cutout of Z-shaped cross section. The two tongues 71*a* and 71*b* of the segment 50 may slide over one another when said segment is compressed. Two clearances 72*a* and 72*h* are provided between the free ends of the tongues 71*a* and 71*b* and the shoulders facing them.

The invention claimed is:

1. A jet engine comprising, from upstream to downstream (the upstream and downstream directions being defined by the direction of circulation of the primary flow), a high-pressure compressor, a diffuser grating and a combustion chamber, said high-pressure compressor comprising an external shell which radially delimits the duct for said primary flow and is connected to an annular structure extending radially outward, said diffuser grating comprising in the axial continuation of said external compressor shell an external casing connected to a rearwardly oriented conical strut delimiting, upstream, the end of said combustion chamber, said strut itself being connected to an external casing shell which extends in the upstream direction and is fastened to said annular structure by fastening means, said strut, said external casing shell and said annular structure defining a cavity around said diffuser grating, air bleed orifices being made in said strut in order to bring the end of the combustion chamber into communication with said cavity, said external casing shell being equipped with air bleed vents and sealing means being provided between said annular structure and said external diffuser grating casing in order to isolate said cavity from the duct for the primary flow, wherein the sealing means comprise a split annular segment whose radially internal part is housed in a radially sliding and sealed manner in a groove provided at the periphery of the upstream part of the external casing of the grating of the diffuser, the periphery of said segment bearing on the internal surface of a cylindrical sleeve which forms part of the annular structure and surrounds said segment.

2. The jet engine as claimed in claim 1, wherein the groove is delimited by an upstream flange and a downstream flange which are formed at the periphery of the upstream part of the external casing.

3. The jet engine as claimed in claim 2, wherein the segment has an I-shaped cross section and its periphery comprises a convex surface.

4. The jet engine as claimed in any one of claims 1 to 3, wherein the internal surface of the sleeve is connected downstream to a frustoconical surface which allows said segment to be compressed during assembly of the diffuser and the compressor.

5. The jet engine as claimed in any one of claims 1 to 3, wherein the outside diameter of the segment in the free state is slightly greater than the inside diameter of the sleeve.

6. The jet engine as claimed in claim 4, wherein the outside diameter of the segment in the free state is slightly greater than the inside diameter of the sleeve.

* * * * *